United States Patent
Mariniello et al.

(10) Patent No.: US 8,346,232 B2
(45) Date of Patent: Jan. 1, 2013

(54) INTERACTION BETWEEN NETWORK SERVICES AND INTELLIGENT NETWORK SERVICES FOR CONTROLLING REROUTING OF A CALL

(75) Inventors: Francesco Mariniello, Salerno (IT); Biagio Maione, Naples (IT); Rogier Noldus, Goirle (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 399 days.

(21) Appl. No.: 12/676,747

(22) PCT Filed: Sep. 5, 2007

(86) PCT No.: PCT/EP2007/059275
§ 371 (c)(1),
(2), (4) Date: Mar. 5, 2010

(87) PCT Pub. No.: WO2009/030273
PCT Pub. Date: Mar. 12, 2009

(65) Prior Publication Data
US 2010/0216444 A1   Aug. 26, 2010

(51) Int. Cl.
*H04W 4/00* (2009.01)
(52) U.S. Cl. .................................. 455/417; 455/412.1
(58) Field of Classification Search ............. 455/412.1, 455/445, 558, 411, 433
See application file for complete search history.

(56) References Cited

U.S. PATENT DOCUMENTS

2006/0276226 A1* 12/2006 Jiang ........................... 455/558
2011/0306322 A1* 12/2011 Roach, Jr. .................. 455/412.1

OTHER PUBLICATIONS

"Interaction between the Intelligent Network application CS4 protocol and the Bearer IndependentCall Control protocol; Q.1922.4 (Dec. 2002)" ITU-T Standard in Force (I), International Telecommunication Union, Geneva, CH, No. Q.1922.4, Dec. 29, 2002.
"Digital cellular telecommunications system (Phase 2+); Universal Mobile Telecommunications System (UMTS); Customized Applications for Mobile network Enhanced Logic (CAMEL) Phase X; CAMEL Application Part (CAP) specification (3GPP TS 29.078 version 7.3.0 Release 7); ETSI 129 078"ETSI Standards, LIS, vol. 3-CN2, No. V7.3.0, Jun. 1, 2007.

* cited by examiner

*Primary Examiner* — Phuoc Doan

(57) ABSTRACT

Rerouting, as specified by ITU-T Q.730 is a network service that is executed by and under control of switching nodes, whereas IN services are executed under the control of a service control entity and invoked for certain calls only. Because of the two levels of control that are also separate from each other, inconsistencies may occur when an IN service is invoked for a call that may be in addition subject to rerouting. This problem is solved-in that a service control entity is adapted to perform the steps of receiving information relating to the rerouting of the call from the service switching entity, selecting a rerouting procedure for the call according to the received information, and sending an instruction to the service switching entity to continue the call according to the rerouting procedure. The information relating to the rerouting of the call information is in particular information about a rerouting capability of a preceding switching node.

30 Claims, 10 Drawing Sheets

INTERACTION BETWEEN NETWORK SERVICES AND INTELLIGENT NETWORK SERVICES FOR CONTROLLING REROUTING OF A CALL

TECHNICAL FIELD

The present invention relates to telecommunications networks, in particular to methods and devices for controlling a rerouting of a call in an Intelligent Network.

BACKGROUND

In a telecommunications network a call initiated by a calling entity to a called entity is routed through a number of switching nodes before it reaches its destination. An example of how a call may be routed from a calling entity to a called entity in a telecommunications network is given with reference to FIG. 1a. A calling entity CE100 sets up a call to a called entity CE105 by sending a call set up request to a switching node 101. The switching node 101 receives the call set up request and analyses the destination number comprised therein, which is typically a number associated to the user of called entity CE105. Depending on the outcome of the analysis the switching node 101 will select the most appropriate next switching node for routing the call further in the most efficient way, thereby using as few as possible switching nodes in the call path to the destination. The switching node 101 selects a switching node 102. Switching nodes 102 and 103 behave in a similar way and route the call further towards switching node 104, which is closest to the called entity CE105. Accordingly a call path is established from the calling entity CE100 to the called entity CE105 with a call path direction as depicted. In general, a call path is a sequence of switching nodes that are subsequently involved in the routing of a call between a calling entity and a called entity. A call path direction is defined to be the course on which the call is being routed or is aimed to be routed, starting at the calling entity and ending at the called entity. Switching nodes 102 and 103 are sometimes also referred to as transit switching nodes, because they function as transits between switching nodes 101 and 104. The switching node 104 then connects the incoming call to called entity CE105 and a speech connection may be opened.

Rerouting, also referred to as Pivot Routing or Redirection, is another routing mechanism that has been specified for example in ITU Telecommunication Standardization Sector (ITU-T) recommendation Q.370 (12/1999). Rerouting can be used to set up a call to a further destination, other than the called entity. The further destination for the purpose of rerouting will be referred to as the rerouting destination entity in the remainder. The switching node in the call path that decides to reroute the call may also be referred to as the invoking node. Depending on the rerouting destination entity, the invoking node may request either a succeeding node in the call path direction to the called entity to reroute the call to the rerouting destination entity, or a preceding node. Such a node should support rerouting, that is, has the capability to perform the rerouting. A switching node that has the capability to reroute a call is also referred to as a rerouting node in literature. A switching node may have the capabilities to act as either or both an invoking node and a rerouting node.

An example of rerouting is given with reference to FIG. 1b. Depicted are main switching nodes 107 to 110 that co-operate when rerouting of a call is required. A switching node 107 propagates a call towards a destination number associated to a called entity CE111, as received from a calling entity CE106. Since the switching node 107 in this example supports rerouting, i.e. has the capability to perform rerouting, if requested by an invoking node, it indicates so to the next switching node. The switching node 107 may include for example a dedicated parameter comprising a rerouting indicator in a call set up message, for example the Initial Addressing Message (IAM) as specified in the Integrated Services Digital Network (ISDN) User Part (ISUP) call control protocol.

During the call set up process the call may transit through one or more (transit) switching nodes 108, similar to the example of FIG. 1a. Any switching node 108 will pass the rerouting indicator as received from the switching node 107 transparently. The decision that rerouting has to be invoked is taken at a switching node 109 acting as the invoking node in this example. The switching node 109 also determines the rerouting destination entity RDE112. Since the call set up message indicates that rerouting can be performed by a preceding switching node in the call path direction, viz. the switching node 107, the switching node 109 requests the preceding switching node 108 in the call path direction to propagate the call back towards the switching node 107 (i.e. opposite to the call path direction to the called party CE111), indicated by the dashed arrow. The switching node 107 then reroutes the call to the rerouting destination entity RDE112. The call may transit via further transit switching nodes between the switching node 107 and the rerouting destination RDE112, not depicted. All network resources, i.e. the one or more transit switching nodes 108 between the switching node 107 and the invoking node 109 are released and can be used for new calls.

In addition to so-called network services such as rerouting, i.e. services executed by and under the control of switching nodes, there are also Intelligent Network services that are executed and controlled by an Intelligent Network (IN). According to the IN concept, service intelligence or service logic is separated from switching functions. This separation basically enables network operators to develop and deploy services and features independently of vendors, allowing more flexibility in service development, simplified rollout, reduced costs and greater autonomy. Examples of IN protocols are the Intelligent Network Application Protocol (INAP), the Advanced IN (AIN), and the Customized Applications for Mobile network Enhanced Logic (CAMEL). INAP was developed for fixed line networks and is the primary protocol used for fixed line IN outside of North America. AIN is a variant developed for North America.

CAMEL is a Global System for Mobile communications (GSM) Phase 2+ and Wideband Code Division Multiple Access (WCDMA) network feature specified in 3GPP TS 22.078. CAMEL is based on core INAP with modifications to take into account, amongst others, subscriber mobility. In particular, CAMEL enables the use of operator-specific services by a subscriber even when roaming outside the subscriber's Home Public Land Mobile Network (PLMN). A CAMEL-based Intelligent Network comprises as main entities a service switching entity for switching tasks, also referred to as SSF (Service Switching Function) or gsmSSF (GSM Service Switching Function) and a service control entity comprising the service intelligence or logic also referred to as SCF (Service Control Function) or gsmSCF (GSM Service Control Function).

Rerouting, as stated before, is a network service that is executed by and under control of switching nodes, whereas IN services are executed under the control of a service control entity and invoked for certain calls only. Because of the two levels of control that are also separate from each other, inconsistencies may occur when an IN service is invoked for a call that may be in addition subject to rerouting. For example, a call may be rerouted by a switching node to a rerouting destination entity, that according to the service logic of an IN service is on a barred list, resulting in inconsistent or undesirable service behavior. Furthermore, the service control entity may apply rerouting itself not having knowledge of rerouting capabilities of switching nodes. This may lead to unnecessary occupation of network resources and rerouting failures.

SUMMARY

It is therefore an object of the invention to provide methods, devices, and computer programs that overcome the aforementioned problems and improve rerouting of a call in a telecommunications network.

This object is achieved by the methods as described in claims 1 and 11. Furthermore, the invention is embodied in a service control entity and a service switching entity according to claims 26 and 27, respectively, and computer programs according to claims 28 and 29, respectively, and a computer-readable medium product according to claim 30. Advantageous embodiments are described in the further claims.

A method for controlling a rerouting of a call from a called entity to a rerouting destination entity in a telecommunications network is described. The telecommunications network comprises a service control entity, a service switching entity and a switching node. The switching node precedes the service switching entity in a call path direction from a calling entity to the called entity.

The service control entity receives information relating to the rerouting of the call from the service switching entity, selects a rerouting procedure for the call according to the received information and sends an instruction to the service switching entity to continue the call according to the rerouting procedure.

The service switching entity receives information relating to the rerouting of the call. The service switching entity sends the information relating to the rerouting of the call to the service control entity. Then the service switching entity receives an instruction from the service control entity to continue the call according to a rerouting procedure selected by the service control entity. In response to receiving the instruction, the service switching entity continues the call according to the instruction received.

The invention provides for a control of a rerouting of a call by a service control entity. According to the invention, the service control entity receives information relating to the rerouting of the call from a service switching entity, e.g. information about a rerouting capability of a preceding switching node, or an indication that rerouting is invoked by a switching node. Based on the received information and according to its internal service logic using a rerouting procedure for the call according to the received information together with the capability to send out a corresponding instruction, the service control entity is fully empowered to control the rerouting of the call. The service control entity may determine how to continue the rerouting of a call when initiated at a switching node of the network, or may decide that the rerouting is allowed or not, or to be modified beside many other options. The instruction to the switching entity effecting that the switching entity continues the call according to the instruction, extends the control over rerouting to further entities of the network like switching nodes. Therefore, inconsistencies in the handling of a rerouting caused by a probable double invocation of a rerouting for one call by both the network and IN can be avoided. Furthermore, the extension of control over rerouting in the network effects an efficient rerouting and avoids unnecessary occupation of network resources and rerouting failures.

The invention furthermore concerns a service control entity and service switching entity. It also concerns a computer program loadable into a processing unit of a service control entity and a computer program loadable into a processing unit of a service switching entity to perform any of the steps of the aforementioned methods when operated at the respective device.

The computer program can be stored on a computer readable medium. The computer-readable medium can be a permanent or rewritable memory within the service control entity or the service switching entity or located externally. The computer program can be also transferred to the service control entity or the service switching entity for example via a cable or a wireless link as a sequence of signals.

In the following, detailed embodiments of the present invention shall be described in order to give the skilled person a full and complete understanding. However, these embodiments are illustrative and not intended to be limiting.

DETAILED DESCRIPTION

Figure 1A:
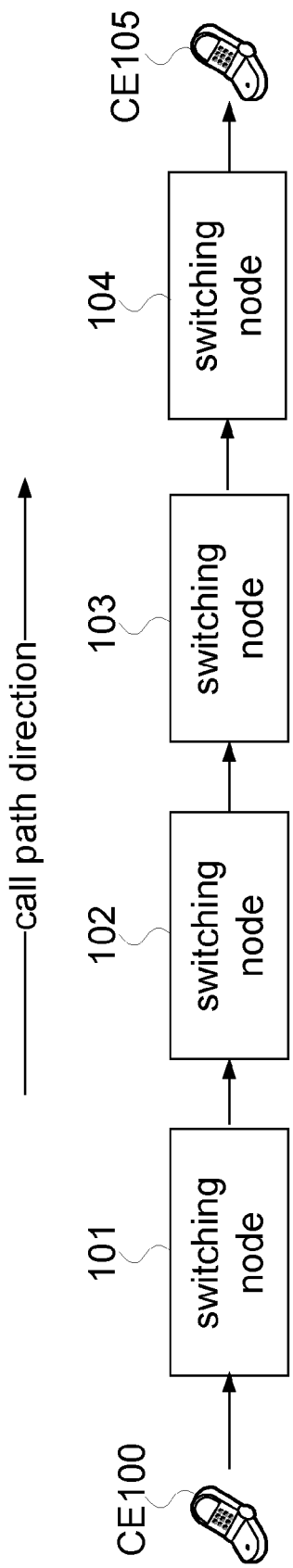
FIG. 1a shows a schematic illustration of a telecommunications network for routing of a call according to the prior art.
Figure 1B:
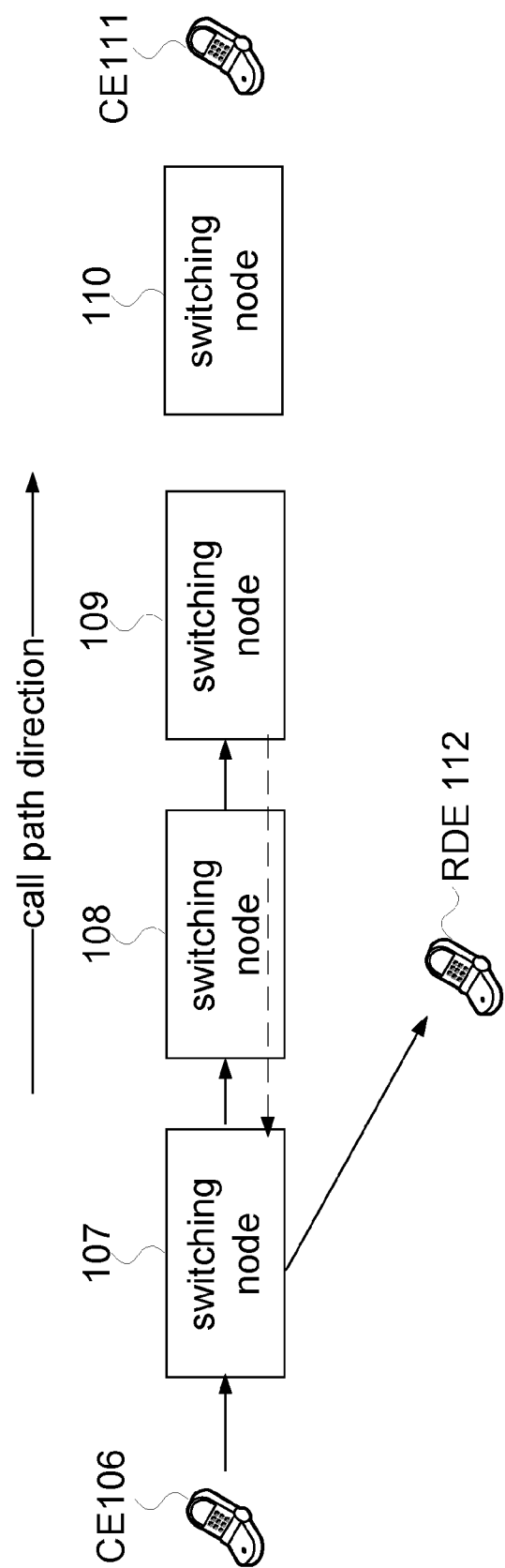
FIG. 1b shows a schematic illustration of a telecommunications network for rerouting of a call according to the prior art.
Figure 2A:
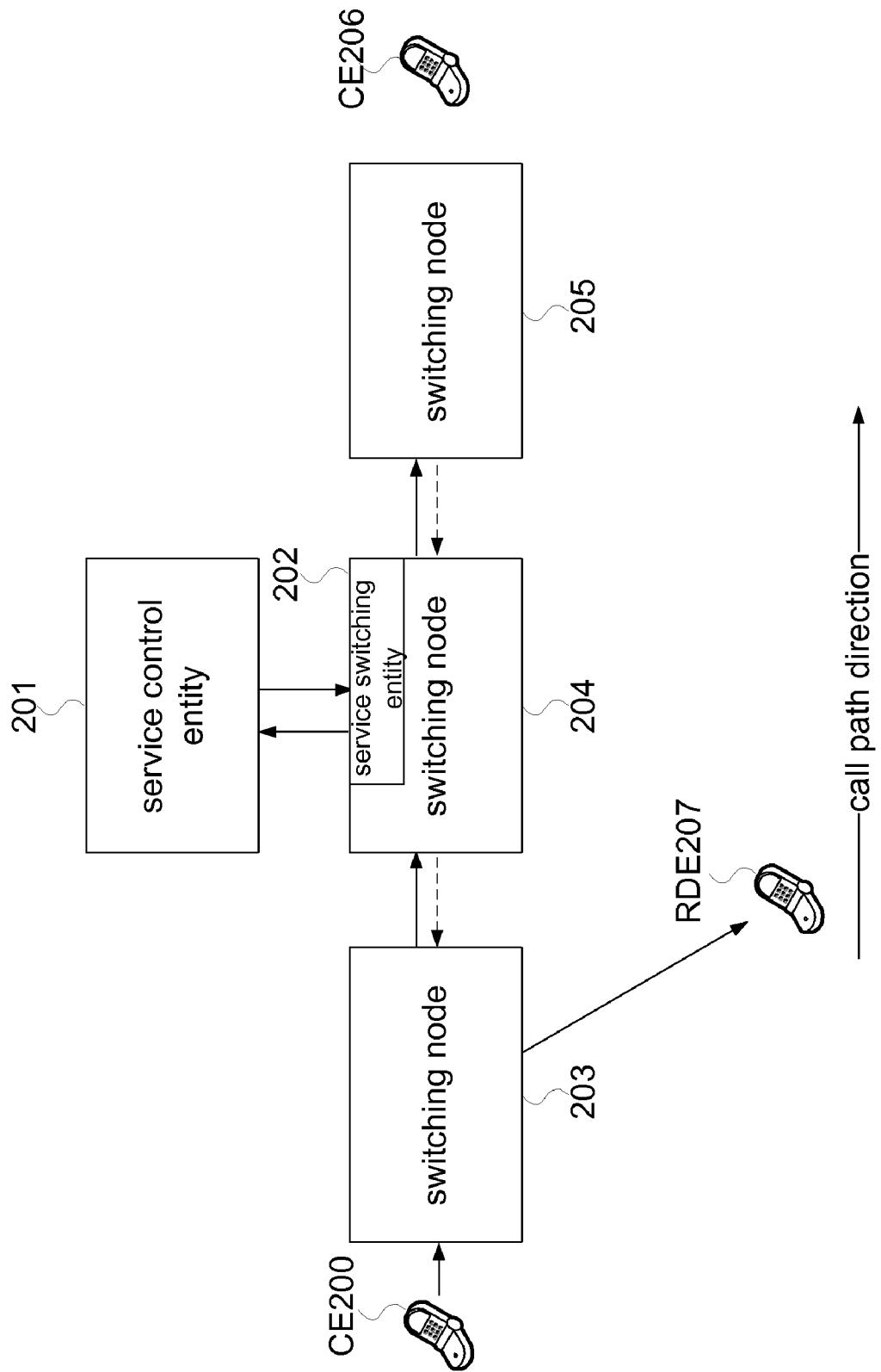
FIG. 2a shows a schematic illustration of a telecommunications network according to a first embodiment of the invention.

FIG. 2a depicts a schematic overview of a telecommunications network comprising an Intelligent Network for a call subject to rerouting.

The Intelligent Network comprises a service control entity 201 and a service switching entity 202. Furthermore, switching nodes 203, 204 and 205 are depicted, each of which may be a Mobile Switching Centre (MSC). The switching node 203 may function as a rerouting node; the switching node 204 may be a transit switching node and the switching node 205 may be an invoking node. Further, a calling entity CE200, a called entity CE206 and a rerouting destination entity RDE207 are depicted.

Intelligent Networks services are executed by and under the control of the service control entity 201. The service control entity 201 is able to communicate with the service switching entity 202 using an Intelligent Network protocol such as CAMEL or INAP. The service switching entity 202 is preferably co-located at a transit switching node 204, but may also be co-located at any of the other types of switching nodes for the purpose of rerouting, such as an invoking node or a rerouting node, as is explained with reference to FIGS. 2b and 2c. Alternatively, the service switching entity 202 may be implemented as a separate node.

According to the embodiment depicted in FIG. 2a, a call from the calling entity CE200 to the called entity CE206 may be rerouted to the rerouting destination entity RDE207, whereby the switching node 205 acts as the invoking node. The switching node 205 propagates the call back (i.e. opposite to the call path direction), indicated by the dashed arrows, via the switching node 204 and the service switching entity 202 to the switching node 203 that acts as the rerouting node in this embodiment. Hence, according to FIG. 2a, the service switching entity 202 is located at the switching node 204 acting as a transit switching node for the purpose of rerouting.

Figure 2B:
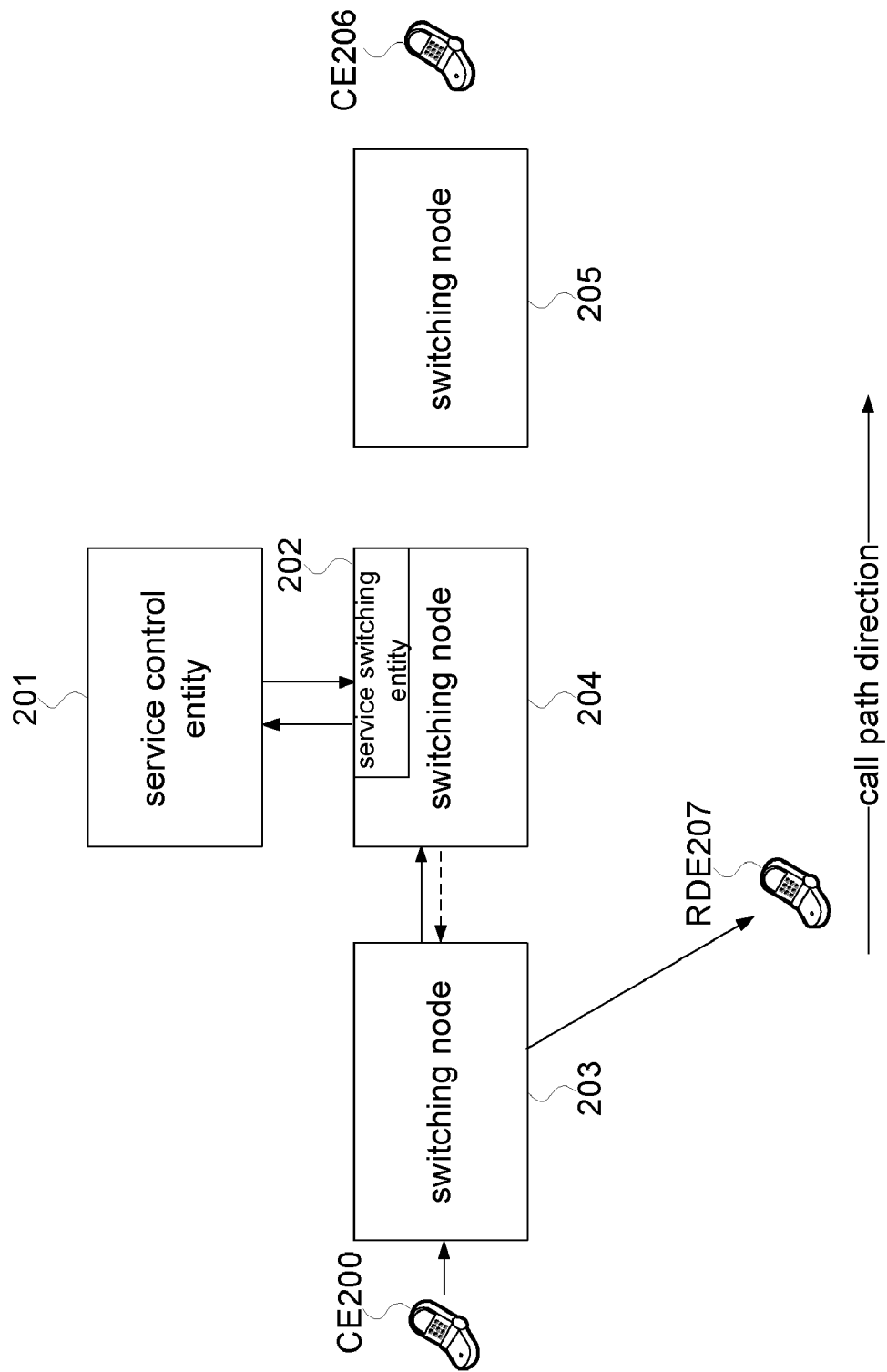
FIG. 2b shows a schematic illustration of a telecommunications network according to a second embodiment of the invention.

According to the embodiment depicted in FIG. 2b, the switching node 204 acts as the invoking node of a rerouting of a call from the called entity CE206 towards the rerouting destination entity RDE207. In order to reroute the call, the switching node 204 requests the preceding switching node 203 in the call path direction to reroute the call to the rerouting destination entity RDE207, indicated by the dashed arrow. In this embodiment, the service switching entity 202 is co-located at the switching node 204 acting as the invoking node.

Figure 2C:
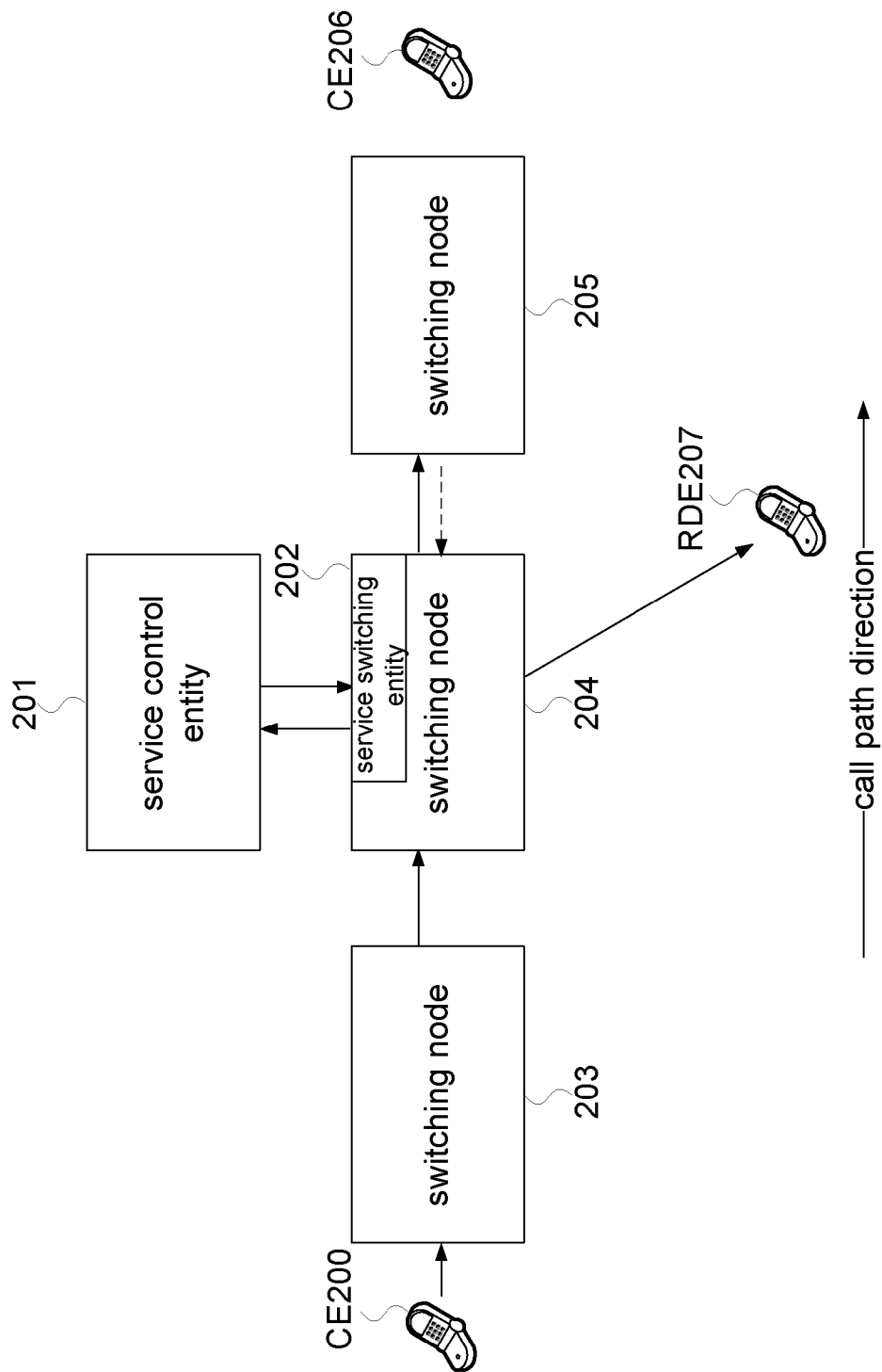
FIG. 2c shows a schematic illustration of a telecommunications network according to a third embodiment of the invention.

FIG. 2c depicts a further embodiment wherein the switching node 205 acts as an invoking node and the switching node 204 as a rerouting node. Similar to the previous embodiments, the switching node 205 requests the preceding switching node 204 in the call path direction to reroute the call to the rerouting destination entity RDE207, indicated by the dashed arrow. Hence, in this embodiment, the service switching entity 202 is co-located at the switching node 204 acting as the rerouting node.

The involvement of the service switching entity 202 and the service control entity 201 in the rerouting of the call is explained with reference to FIGS. 3a and 3b.

Figure 3A:
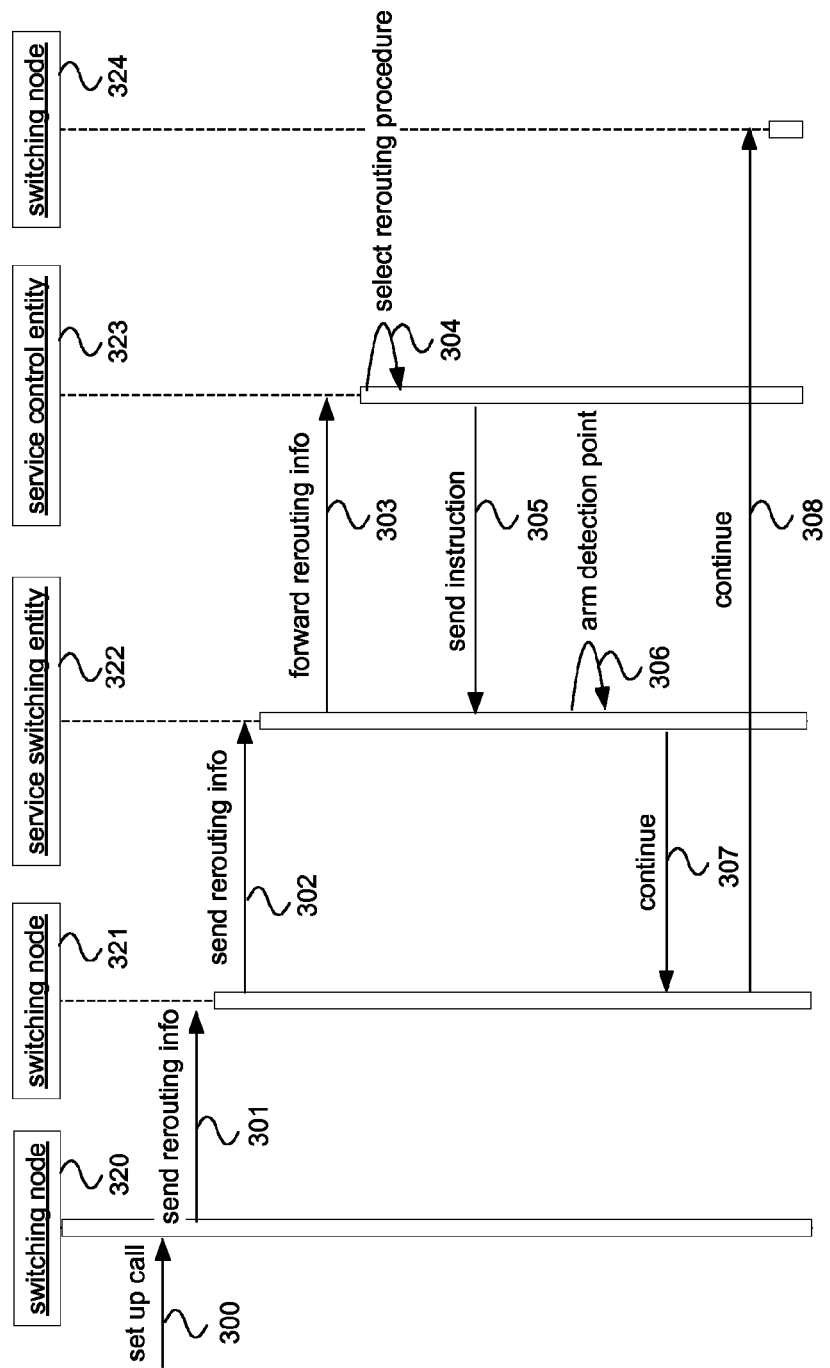
FIG. 3a shows a sequence diagram depicting messages exchanged in a telecommunication network in an exemplary embodiment of the invention executed at call set up.

FIG. 3a depicts a sequence diagram showing messages exchanged in a telecommunication network at call set up. Depicted are switching nodes 320, 321 and 324, a service switching entity 322 and a service control entity 323. The switching node 320 is capable to act as a rerouting node and precedes the switching node 321 in a call path direction from a calling entity (not depicted in FIG. 3a) to a called entity (not depicted in FIG. 3a). The calling entity, if depicted, would be preceding the switching node 320 and the called entity, if depicted, would be succeeding the switching node 324. The service switching entity 322 may be co-located at the switching node 321. The service switching entity 322 communicates to other switching nodes via the switching node 321. Hence, the switching node 321 can both be a preceding node and a succeeding node to the service switching entity 322 in the call path direction, because it can act both as a sender and a receiver to the service switching entity 322 in the same call path direction. Otherwise, the switching node 321 may be omitted from the sequence diagram because its further function is merely a transit node to the service switching entity. The service control entity 323 comprises service logic for executing Intelligent Network services and is able to communicate with the service switching entity 322. Furthermore, there is depicted the switching node 324 succeeding the service switching entity 322 in the call path direction. The call path of a call from the calling entity to the called entity may be formed sequentially by switching nodes 320, 321, service switching entity 322, switching nodes 321 and 324. The switching node 324 may act as a further rerouting node or as an invoking node for the purpose of rerouting.

During the handling of a call set up, the switching node 320 receives in step 300 a call set up message originating from the calling entity, to a first destination number associated to a user of the called entity. This message may be an IAM in case of call control protocol ISUP. Any switching node that is capable to act as a rerouting node, i.e. supports the rerouting of the call, should indicate this to the next switching node in the call path direction, which is in accordance with standardized rerouting mechanisms. In step 301 the switching node 320 signals its rerouting capability, e.g. by including an indication of the rerouting capability in the call set up message, towards the switching node 321. The switching node 321 sends the call set up message including the rerouting information indicating the rerouting capability of the switching node 320, to the service switching entity 322. The switching node 321 may also add to the call set up message an indication of its own rerouting capability or replace the indication of the rerouting capability of the switching node 320 by the indication of its own rerouting capability. The service switching entity 322 sends the rerouting information comprising the indication of the rerouting capability to the service control entity 323 in step 303, preferably in a dedicated information element in an initial message, preferably a CAMEL Initial Detection Point message. The service control entity 323 is thus provided with an indication whether a preceding switching node supports rerouting. Now, the service control entity is able to select a rerouting procedure for the call taking knowledge about one or more rerouting capabilities of one or more preceding switching nodes into account.

The usage of an initial message provides that the service control entity 323 is informed about rerouting capabilities of one or more preceding switching nodes in the network at an initial stage of the call. It allows the service control entity 323 to take control of the processing of the call at an early stage, preferably even before any rerouting has actually been invoked. The information element is preferably dedicated, i.e. pre-defined values may be used for indication of a rerouting capability at pre-defined positions within the initial message with the pre-definitions known to both the service control entity 323 and the service switching entity 322. A common notation with pre-defined values and a pre-defined position of the information element in the initial message eases the insertion and extraction of a value for both the service switching and service control entity. The initial message and the dedicated information element are preferably standardized although proprietary extensions may be used if standardization is not possible.

Typically, the service switching entity 322 sends the rerouting information indicating the rerouting capability unchanged to the service control entity 323, but it is also possible that the rerouting information is modified by the service switching entity 322 before sending it to the service control entity 323, e.g. the information may be reformatted by the service switching entity 322 for integrity or readability purposes, or the content may be changed, or new information may be added. A modification of the rerouting information hence can increase the flexibility of the method. The service control entity 323 comprises service logic for determining how to respond to the rerouting information and selects a rerouting procedure accordingly in step 304. In particular, the rerouting procedure may comprise a rerouting permission related to a switching node. A rerouting permission may relate to an allowance or not-allowance for the rerouting of a call.

An instruction in accordance with the rerouting permission which is sent from the service control entity 323 to the service switching entity 322, instructs the service switching entity 322 to continue the call according to the rerouting procedure comprising the rerouting permission. Hence, a defined permission status can be introduced under the control of the service control entity 323 at the service switching entity 322 and hence within the network as a whole, thus further minimizing any inconsistencies in rerouting.

In step 305 the service control entity 323 sends an instruction to the service switching entity 322 in accordance with the selected rerouting procedure. The instruction may be sent in a CAMEL ContinueWithArgument message, in a CAMEL Connect, or in a CAMEL Request Report BCSM (Basic Call State Model) message.

Several alternatives to the call set up process may be performed depending on the rerouting procedure selected.

In a first embodiment the rerouting procedure may comprise a rerouting permission indicating that any invocation of rerouting by a succeeding switching node is to be suppressed. Accordingly, the service control entity 323 is enabled to give priority to a rerouting invoked according to an IN service, thereby preventing any undesirable effects caused by two invocations of a rerouting for one call. The service control entity 323 may decide to suppress the invocation of a subsequent rerouting, based on subscription information of the calling or the called entity. The service control entity 323 instructs the service switching entity 322 in step 305 accordingly. The instruction may be sent in a CAMEL ContinueWithArgument or CAMEL Connect message, comprising an indication that a subsequent invocation of rerouting is to be suppressed. Step 306 of arming a detection point for rerouting is not performed in this embodiment.

In response to the instruction from the service control entity 323, the service switching entity 322 may send a message towards the following switching node 324, via switching node 321, to indicate that any subsequent rerouting is to be suppressed in steps 307 and 308. For example, the service switching entity 322 may delete or change the rerouting information comprised in the call set up message, before sending the call set up message towards the following switching node 324, via switching node 321. By deleting or changing the rerouting information the service switching entity 322 can inform the succeeding switching nodes that rerouting is to be suppressed for the call.

The rerouting procedure may prescribe in a further embodiment that any subsequent invocation of rerouting is allowed, provided that the service control entity 323 is informed upon invocation of the rerouting. A notification about an invocation of rerouting occurring subsequently in the call allows the service control entity 323 to control the later invocation of the rerouting, for example it may screen the rerouting destination entity and possibly decide to block rerouting after all. The service switching entity 322 receives an instruction from the service control entity 323 in step 305 indicating that the service control entity 323 requires a notification when rerouting is invoked subsequently in the call. The instruction may be sent in a CAMEL Request Report BCSM message, comprising an indication that the service switching entity 322 should initiate a process for detecting an invocation of rerouting.

Subsequently the service switching entity 322 may arm a detection point according to the basic call state model (BCSM) in step 306, for detecting the event that rerouting is invoked by a switching node succeeding the service switching entity 322 in the call path direction. This allows the service switching entity 322 to be notified when rerouting is invoked by a succeeding node and to report that event to the service control entity 323. In step 307 the service switching entity 322 may inform the next switching node 321 in a message, e.g. a call set up message, to continue the call set up process without changing the rerouting information as received from the preceding switching node 320.

In yet another embodiment, the rerouting procedure may comprise a rerouting permission indicating that rerouting is allowed, but should be performed by a switching node succeeding the service switching entity 322 in the call path direction from the calling entity to the first called entity, i.e. on the outgoing side of the service switching entity 322. This has the effect that the dialogue between the service control entity 323 and the service switching entity 322 can be maintained during the actual rerouting of the call. Hence, the service control entity 323 may remain in the call until the actual rerouting to the rerouting destination entity is performed, and is enabled to send further instructions. The service control entity 323 sends an instruction to the service switching entity 322 accordingly in step 305, preferably in a CAMEL ContinueWithArgument message comprising an indication that rerouting is allowed to be performed by a succeeding switching node or in a CAMEL Continue message.

The service switching entity 322 may respond by informing the next switching node 321 in a message, e.g. a call set up message, to continue the call set up process and including an indication that any of the next switching nodes 321 or 324 is allowed to perform rerouting.

In a further embodiment the rerouting procedure may specify that rerouting is allowed without any involvement of the service control entity 323. According to this embodiment, the service control entity may decide at an early stage of the call that it does not need to be informed of a possible subsequent rerouting invoked by the network. Hence, the service switching entity 322 is not required to initiate any monitoring on the invocation of a rerouting. Also, the dialogue between the service control entity 323 and the service switching entity 322 can be terminated, which saves network resources. The service control entity 323 may instruct the service switching entity 322 in step 305 accordingly. The instruction may be sent in a CAMEL ContinueWithArgument message comprising an indication that rerouting is allowed or in a CAMEL Continue message. The service switching entity 322 may instruct the following switching node 321 in a message, e.g. a call set up message, to continue the call set up process and thereby leaving the rerouting information received from the switching node 320 unchanged. According to this embodiment any subsequently invoked rerouting may result in the call being rerouted to the rerouting destination entity by any of the preceding or succeeding switching nodes or by the service switching entity 322 itself.

Figure 3B:
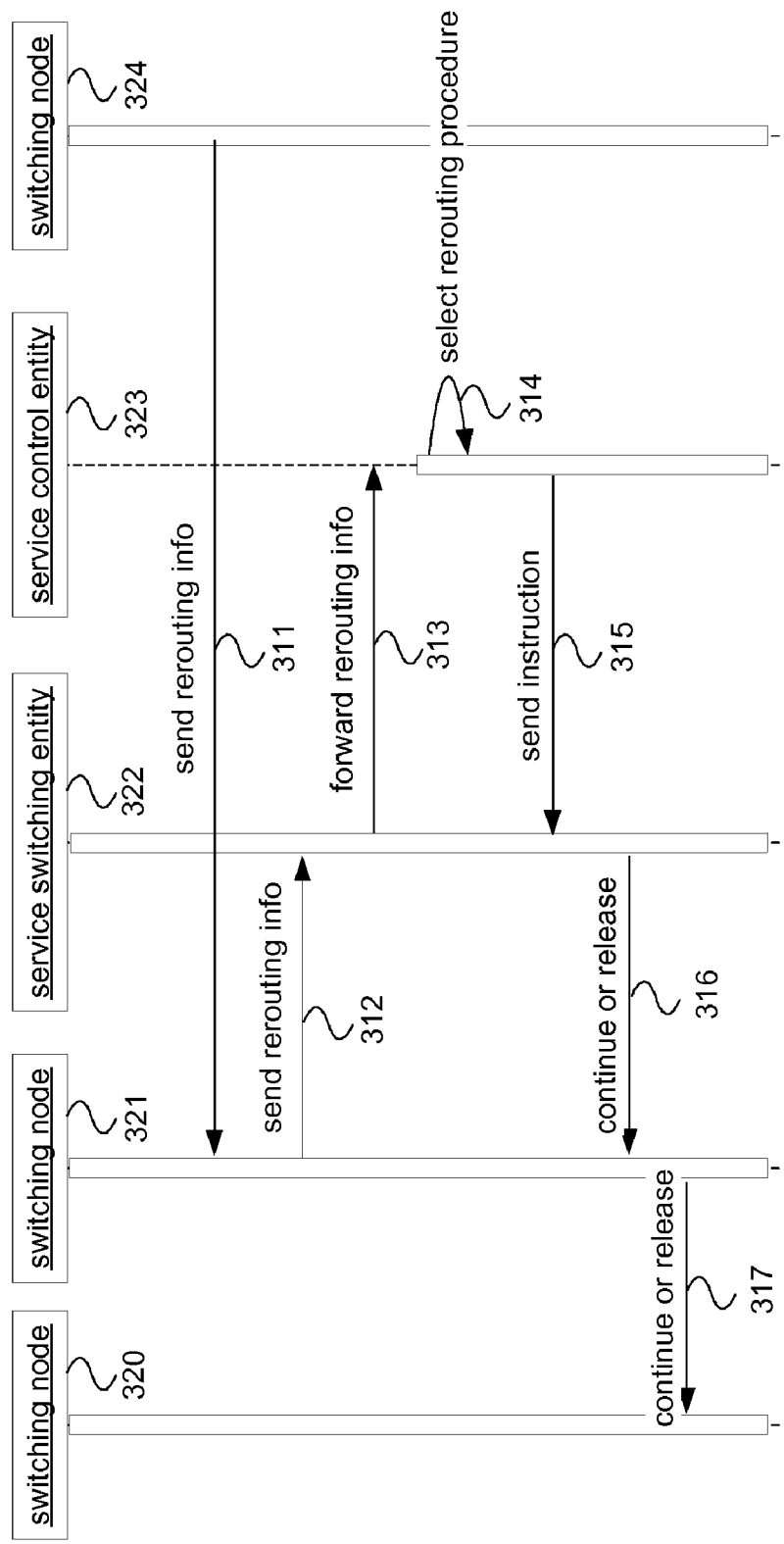
FIG. 3b shows a sequence diagram depicting messages exchanged in a telecommunication network in an exemplary embodiment of the invention executed after initiation of rerouting at an invoking node.

In FIG. 3b detailed operation of an embodiment of the invention is depicted that occurs after rerouting of the call is invoked. In this embodiment it is possible, but not necessary, that earlier in the call set up process the service control entity 323 has requested to be informed when rerouting is invoked, for example as described with reference to FIG. 3a. Accordingly the service switching entity 322 may have armed a detection point for detecting the invocation of rerouting.

A switching node 324 may decide that rerouting is to be invoked and may determine the new destination of the call, i.e. the rerouting destination entity (not depicted in FIG. 3b). The switching node 324 thus behaves as an invoking node as explained above. Subsequently, the switching node 324 may send a request in opposite direction of the call path direction to perform rerouting in step 311. The request may be an ISUP release message comprising an indication of the rerouting destination entity and comprising further rerouting information such as the cause of the rerouting invocation which is laid down in a cause code.

As soon as the service switching entity 322 receives a notification of the request in step 312 via the switching node 321, it sends an indication of the invocation of the rerouting at the switching node 324 to the service control entity 323 in step 313. In addition, the service switching entity 322 may also send the indication of the rerouting destination entity to the service control entity 323. The service switching entity 322 may also inform the service control entity 323 of the cause code and possibly of other relevant rerouting information that is sent along with the request for rerouting by the switching node 324. Because the service control entity 323 receives the indication of the invocation of the rerouting from the service switching entity 322 early after the invocation of the rerouting, it is able to take control of the rerouting in time before the rerouting has actually become effective. The service control entity 323 may for example allow or forbid the rerouting. Since the service control entity 323 is also informed about the rerouting destination entity, it may check whether the rerouting destination entity is on a barred list and take appropriate action.

The indication of the invocation of rerouting, the indication of the rerouting destination entity and any other rerouting information such as the cause code may be sent to the service control entity 323 preferably in one or more dedicated information elements in a CAMEL Event Report Basic Call State Model (Event Report BCSM) message.

The service control entity 323 comprises service logic for analyzing the received rerouting information and for determining how to respond to the received rerouting information, and selects a rerouting procedure accordingly in step 314. In particular, the rerouting procedure may comprise a rerouting permission related to a switching node. A rerouting permission may relate to an allowance or not-allowance for the rerouting of a call.

In step 315 the service control entity 323 sends an instruction to the service switching entity 322 in accordance with the selected rerouting procedure.

Depending on the rerouting procedure selected several alternatives to the call rerouting process may be performed.

In a first embodiment, the service control entity 323 may select in step 314 a rerouting procedure comprising a rerouting permission indicating that rerouting to the rerouting destination entity is allowed and that the service control entity 323 requires to remain in the call. According to this embodiment it is assumed that earlier in the call, the service control entity 323 had received an indication from the service switching entity 322 that the service switching entity 322 is prepared to perform, in cooperation with a preceding switching node 321, the rerouting of the call, not depicted. The indication may be sent from the service switching entity 322 to the service control entity 323 in a CAMEL Event Report BCSM message, including e.g. a busy event detection point and a rerouting-pending indication. The presence of the rerouting-pending indication in the CAMEL Event Report BCSM message informs the service control entity 323 that the service switching entity 322 is prepared to perform rerouting to a rerouting destination entity. An indication of the rerouting destination entity is included in the rerouting-pending indication.

The service switching entity 322 is instructed by the service control entity 323 in step 315, for example by means of a CAMEL Request Report BCSM message followed by a CAMEL Continue message. Because the service switching entity 322 had sent a rerouting-pending indication to the service control entity 323, the sending of the CAMEL Request Report BCSM message prior to the sending of the CAMEL Continue message has the effect that the dialogue between the service control entity 323 and the service switching entity 322 remains active.

In response to the instruction from the service control entity 323, the service switching entity 322 may send a message, e.g. a call set up message, comprising the rerouting destination entity to a preceding switching node 321 indicating that the call is to be set up to said rerouting destination entity in step 316. The switching node 321 may, in response to the aforementioned message from the service switching entity 322, set up the call to the rerouting destination entity.

In another embodiment, the rerouting procedure selected in step 314 may comprise a rerouting permission indicating that rerouting to the rerouting destination entity is allowed and that the service control entity 323 does not require to remain in the call. According to this embodiment, the service control entity may decide e.g. based on the indication of the rerouting destination entity, that rerouting can continue without involvement of the Intelligent Network. Hence, the dialogue between the service control entity 323 and the service switching entity 322 can be terminated, which saves network resources. Accordingly, the service control entity 323 sends an appropriate instruction to the service switching entity 322 in step 315, for example a CAMEL Continue message or a CAMEL ContinueWithArgument message. The latter one may be used if the service control entity 323 may want to replace the original cause code, as received from the invoking node 324, by a new cause code.

The service switching entity 322 may subsequently propagate the ISUP release message that it received from the switching node 324, further in opposite direction of the call path direction in step 316. The ISUP release message comprises the indication of the rerouting destination entity and an indication that the call is allowed to be rerouted to the rerouting destination entity by any of the preceding switching nodes 321 or 320. The dialogue between the service control entity 323 and service switching entity 322 is terminated. The call is rerouted to the rerouting destination entity by the preceding switching nodes 321 and 320.

According to a further embodiment, the service control entity 323 may select a rerouting procedure prescribing that the rerouting destination entity e.g. is not approved and prescribing to reroute the call to a modified rerouting destination entity in step 314. Hence, the service control entity 323 is able to change the rerouting of the call with respect to the rerouting destination in accordance with internal subscription information. The possibility to reroute to a modified destination entity can thus provide for an increase in flexibility which is beneficial among other advantages, like increase in security (e.g. for an untrusted rerouting destination entity) and/or an increase of rerouting success (e.g. due to an unavailability of a rerouting destination entity).

The service control entity 323 sends in step 315 an instruction to the service switching entity 322, preferably a CAMEL Connect message comprising an indication of the modified rerouting destination entity. In response to the CAMEL Connect message from the service control entity 323, the service switching entity 322 may send a message, e.g. a call set up message, comprising the indication of the modified rerouting destination entity to the switching node 321 indicating that the call is to be set up to said modified rerouting destination entity in step 316.

The service control entity 323 may alternatively send a CAMEL ContinueWithArgument message or a CAMEL Release Call message, each comprising an indication of the modified rerouting destination entity. In response to either of these messages, the service switching entity 322 may propagate the ISUP release message to the switching node 321 in step 316, whereby the ISUP release message comprises the indication of the modified rerouting destination entity and an indication that the call is allowed to be rerouted to the modified rerouting destination entity by any of the preceding switching nodes 321 or 320. In response to the ISUP release message, the switching nodes 321 or 320 may reroute the call to the modified rerouting destination entity.

In yet another embodiment, the rerouting procedure selected in step 314 comprises a rerouting permission indicating that the rerouting destination is not approved and rerouting is not allowed. In step 315 the service control entity 323 instructs the service switching entity 322 accordingly, preferably in a CAMEL ContinueWithArgument message, including an indication that the call is not allowed to be rerouted. The service switching entity 322 subsequently sends a message to the preceding switching node 321 comprising the indication that the call is not allowed to be rerouted. Alternatively, the service control entity 323 may send a CAMEL Release Call message. In response, the service switching entity 322 may send the ISUP release message that was received from the switching node 324, to switching node 321 after having removed the rerouting information contained therein. As a result the call will be released and hence no rerouting is effected. This embodiment is particularly advantageous when the service control entity 323 invokes at this stage of the call an IN rerouting service, having priority over the rerouting as invoked by the switching node 324. Now, the rerouting invoked by the switching node 324 is terminated and inconsistencies caused by double invocation of rerouting are avoided.

Figure 4:
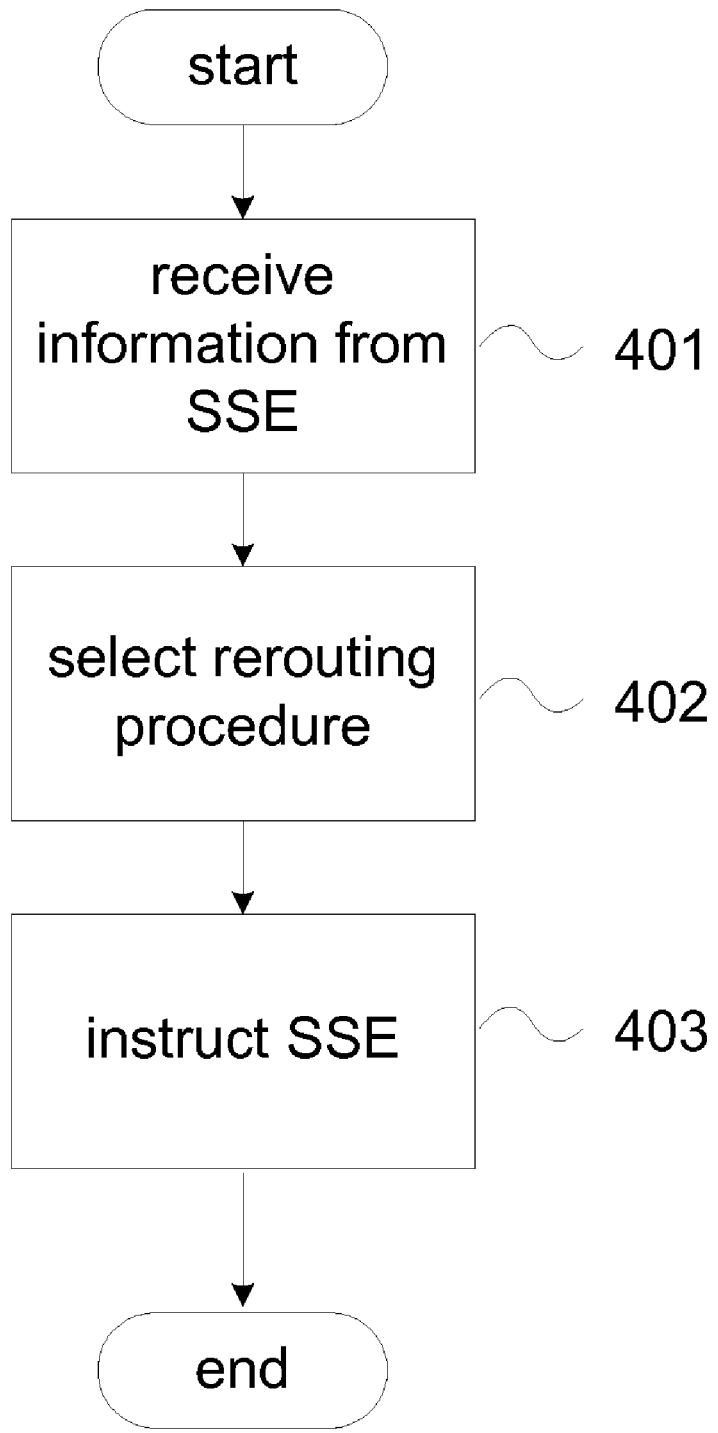
FIG. 4 shows a flow diagram of method steps performed by a service control entity.

FIG. 4 depicts the steps performed by a service control entity according to an embodiment of the invention.

The method according to FIG. 4 may start when a service switching entity sends an initial message, for example a CAMEL Initial Detection Point message, comprising a rerouting indicator originating from a preceding switching node in a call path direction from the calling entity and the called entity. Alternatively, the method of FIG. 4 may be triggered by a service switching entity sending an event report indicating that rerouting has been invoked by a succeeding switching node in the call path direction.

The service control entity performs the step of receiving rerouting information in step 401. Said information may be obtained from the initial message, e.g. by extracting data relating to said information from said message, or from an event report notifying the service control entity of the invocation of rerouting and comprising an indication of a rerouting destination entity, or both.

The method may proceed further to step 402 wherein a rerouting procedure for the call by the service control entity is selected. Service logic of the service control entity may analyze the obtained information comprising the rerouting indicator or the rerouting cause code and the indication of the rerouting destination entity.

According to step 403, an instruction is sent from the service control entity to the service switching entity to continue the call according to the selected rerouting procedure.

The method may end here or may continue with any of the steps described herein.

Figure 5:
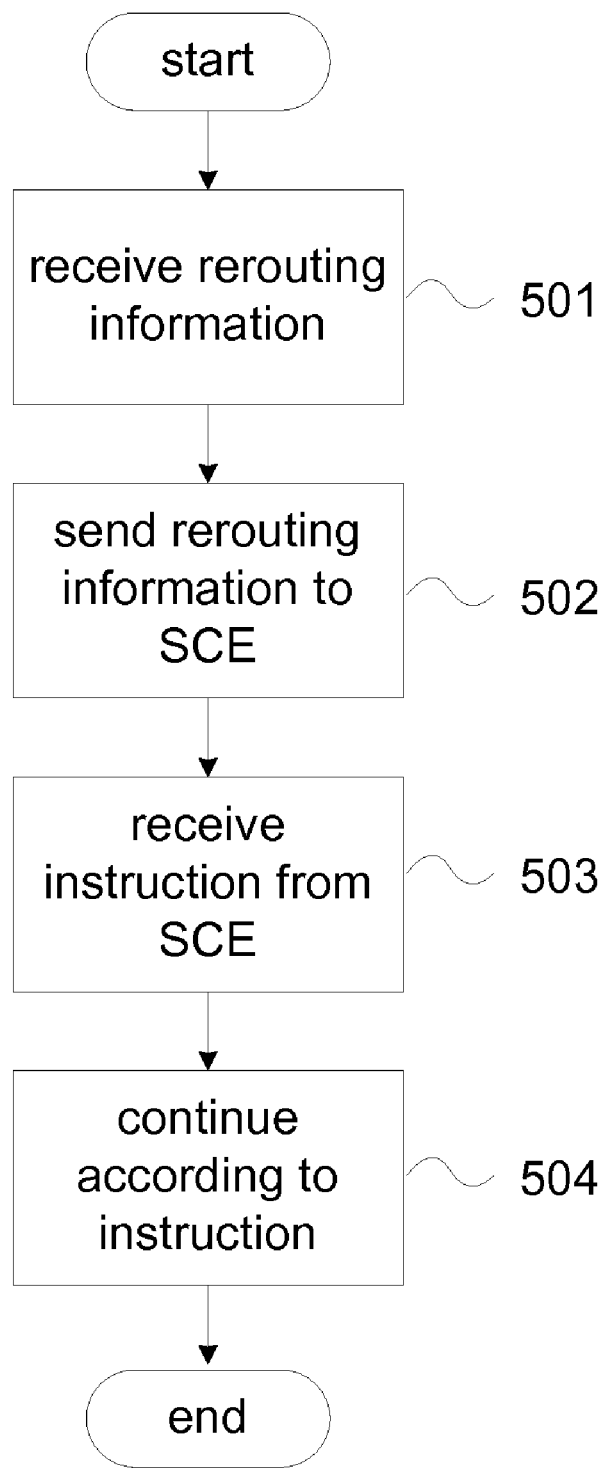
FIG. 5 shows a flow diagram of method steps performed by a service switching entity.

FIG. 5 shows the steps performed by a service switching entity according to an embodiment of the invention.

The method according to FIG. 5 may start when a switching node preceding the service switching entity in the call path direction from a calling entity to a called entity, passes on a call set up message to the service switching entity comprising an indication that the switching node may perform rerouting and hence may act as a rerouting node. Alternatively, the method may start when an invoking node succeeding the service switching entity in the call path direction sends a request to perform rerouting to a rerouting destination entity and the service switching entity receives an indication of the request.

According to step 501 the service switching entity may perform the step of receiving rerouting information from the preceding switching node, whereby the rerouting information comprises a rerouting indicator. Alternatively, the service switching entity may receive rerouting information comprising an indication of the rerouting destination entity from the invoking node after rerouting has been invoked by said invoking node.

Subsequently, the service switching entity performs the step of sending the rerouting information to a service control entity in step 502. In the case that the service switching entity received the rerouting information from the preceding switching node it may send the rerouting information to the service control entity in an initial message, preferably a CAMEL Initial Detection Point (IDP) message, comprising a dedicated information element for the rerouting information. In the alternative case, the switching entity sends the rerouting information from the invoking node in an event report to the service control entity. The event report may comprise the indication of the rerouting destination entity and any relevant rerouting information such as the cause code as received from the invoking node. In both cases above, the service switching entity may modify the rerouting information before sending it to the service control entity.

According to step 503 the service switching entity performs the step of receiving an instruction from the service control entity. The instruction may be received in a CAMEL Connect, Release Call, Request Report BCSM, Continue or a ContinueWithArgument message, depending on the type of instruction.

The method may proceed further to step 504 wherein the service switching entity performs the step of executing the instruction, that is, continuing the call according to the instruction received.

The method may end here or may continue with any of the steps described herein.

The invention is furthermore embodied in devices which are described in more detail below in relation to FIG. 6 and FIG. 7. Reference signs are used for illustration only and are not intended to be limiting.

Figure 6:
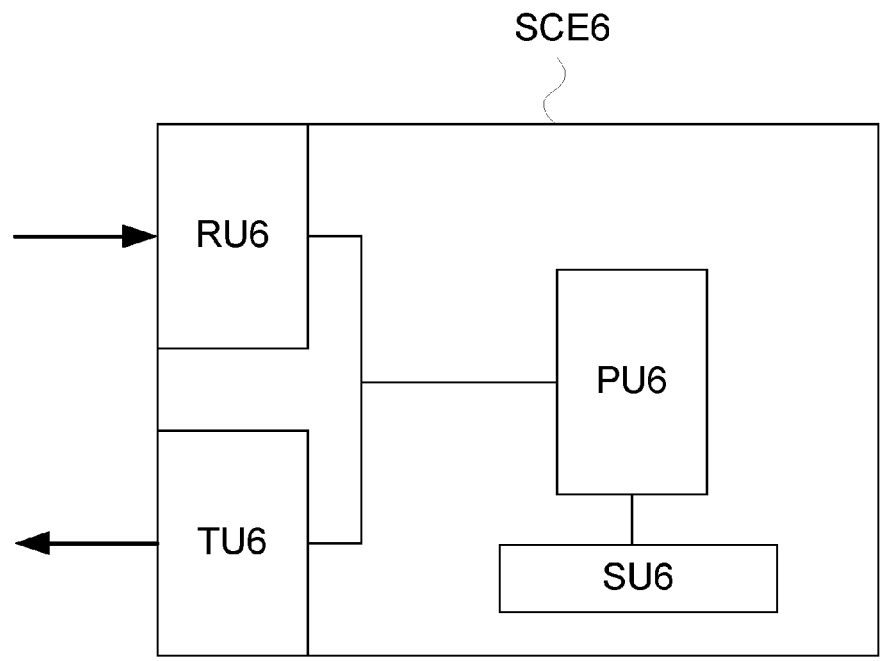
FIG. 6 shows a block diagram of an embodiment of a service control entity.

FIG. 6 depicts an embodiment of a service control entity SCE6 comprising a receiving unit RU6 for receiving messages, a transmitting unit TU6 for transmitting messages, a processing unit PU6 for processing messages and information, and preferably a storage unit SU6 for storing and/or obtaining of stored information.

A service control entity may be a stand alone device. However, it is also conceivable that a service control entity is operating at a switching node, e.g. as a hardware and/or software sub-unit of the switching node. The service control entity may be installed and operated at the switching node sharing none of the units RU6, TU6, PU6, SU6 with the switching node or sharing at least one of the units RU6, TU6, PU6, SU6 with units of a switching node. An alternative embodiment is a service control entity according to a computer program loaded into the processing unit of a switching node.

The processing unit PU6 may be adapted to process information relating to the rerouting of the call received via the receiving unit RU6 from a service switching entity. Furthermore, the processing unit PU6 may be adapted to select a rerouting procedure for the call according to the received information, and to initiate a transmission via the transmission unit TU6 of an instruction to the service switching entity to continue the call according to the selected rerouting procedure.

According to a preferred embodiment, the processing unit PU6 may be adapted to process information relating to the rerouting of the call. The information relating to the rerouting of the call may comprise an indication whether a switching node preceding the service switching entity in the call path direction from a calling entity to the called entity, supports rerouting of the call.

Preferably, the information relating to the rerouting of the call is received at the receiving unit RU6 in an initial message comprising a dedicated information element for indicating the information relating to the rerouting of the call. The processing unit PU6 may be adapted to process this information. In particular, the processing unit PU6 may be adapted to extract the information from the message and to obtain information relating to the rerouting of the call from the extracted information based on which the selection of the rerouting procedure can be executed.

The processing unit PU6 may be further adapted to select a rerouting procedure that prescribes that the service control entity receives a notification when rerouting is invoked subsequently in the call, e.g. during the call set up process. The processing unit PU6 may be adapted to initiate a sending, via the transmission unit TU6, of an instruction for instructing the service switching entity according to the selected rerouting procedure.

Alternatively or in addition, the processing unit PU6 may be adapted to select a rerouting procedure that comprises a rerouting permission relating to a switching node. In one embodiment the rerouting permission may comprise an indication that the call is allowed to be rerouted by a switching node that succeeds the service switching entity in the call path direction of the call. The processing unit PU6 may be further adapted to initiate a transmission to the service switching entity, via the transmission unit TU6, of an instruction according to the selected rerouting procedure, i.e. an instruction indicating the rerouting permission comprising an indication the call is allowed to be rerouted by a succeeding switching node.

According to another preferred embodiment, the rerouting permission may comprise an indication that the call is not allowed to be rerouted. The processing unit PU6 may be further adapted to initiate a sending, via the transmission unit TU6, of an instruction for instructing the service switching entity according to the selected rerouting procedure, i.e. an instruction indicating a rerouting permission comprising an indication that the call is not allowed to be rerouted.

Furthermore, the receiving unit RU6 may be adapted to receive information relating to the rerouting of the call comprising an indication of the invocation of the rerouting of the call at a further switching node that succeeds the service switching entity in the call path direction from the calling entity to the called entity. In addition, the receiving unit RU6 may be adapted to receive information relating to the rerouting of the call comprising an indication of the rerouting destination entity. Preferably, the receiving unit RU6 may be adapted to receive the information relating to the rerouting of the call in a message, preferably a CAMEL event report message, comprising a dedicated information element for the indication of the invocation of the rerouting of the call and/or a dedicated information element for the indication of the rerouting destination entity. The processing unit PU6 may be adapted to process this information. In particular the processing unit PU6 may be adapted to extract the information from the message and to obtain the indication of the invocation of the rerouting and/or to obtain the indication of the rerouting destination entity.

According to another preferred embodiment, the processing unit PU6 may be adapted to select a rerouting procedure comprising a rerouting permission indicating that the call to the indicated rerouting destination entity is allowed.

The processing unit PU6 may be adapted to initiate a transmission to the service switching entity, via the transmission unit TU6, of an instruction according to the selected rerouting procedure.

Alternatively, the processing unit PU6 may be adapted to select a rerouting procedure that prescribes to reroute the call to a modified rerouting destination entity. In addition, the processing unit PU6 may further be adapted to initiate a sending, via the transmission unit TU6, of an instruction for instructing the service switching entity according to the selected rerouting procedure.

Figure 7:
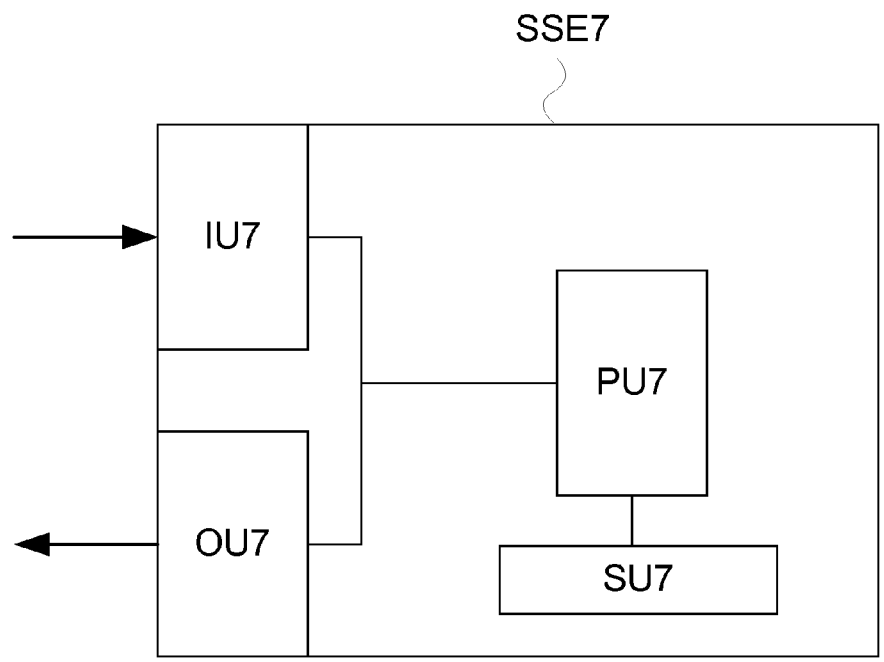
FIG. 7 shows a block diagram of an embodiment of a service switching entity.

FIG. 7 depicts an embodiment of a service switching entity SSE7 comprising an input unit IU7, an output unit OU7, a processing unit PU7 for processing messages and information, and preferably a storage unit SU7 for storing and/or obtaining of information.

A service switching entity may be a stand alone device and input unit IU7 and output unit OU7 being external interfaces like a receiving unit for receiving messages and a transmission unit for transmitting messages, respectively. Preferably, a service switching entity is operating at a switching node, e.g. as a hardware and/or software sub-unit of the switching node. The service switching entity may be installed and operated at the switching node sharing none of the units IU7, OU7, PU7, SU7 with the switching node or sharing at least one of the units IU7, OU7, PU7, SU7 with units of a switching node comprising a receiving unit for receiving messages, a transmission unit for sending messages, a processing unit for processing messages and information, and preferably a storage unit. A preferred embodiment is a service switching entity according to a computer program loaded into the processing unit of a switching node.

The processing unit PU7 may be adapted to process information relating to the rerouting of the call received via the input unit IU7 and to send the information relating to the rerouting of the call to a service control entity via output unit OU7. Furthermore, the processing unit PU7 may be adapted to process an instruction from the service control entity received via the input unit IU7, instructing the service switching entity to continue the call according to a rerouting procedure selected by the service control entity, and to continue the call according to the instruction received.

According to a preferred embodiment, the input unit IU7 may be adapted to receive information relating to the rerouting of the call comprising an indication whether a switching node preceding the service switching entity in the call path direction supports rerouting of the call. The processing unit PU7 may be adapted to process this information.

The processing unit PU7 may be further adapted to initiate sending of the information relating to the rerouting of the call via the output unit OU7 to the service control entity in an initial message comprising a dedicated information element for indicating the information relating to the rerouting of the call. The processing unit PU7 may have modified the information before initiating to send it to the service control entity.

According to another preferred embodiment, the input unit IU7 is adapted to receive an instruction from the service control entity in response to the sending of the information relating to the rerouting of the call to the service control entity. The instruction may comprise an indication that the service control entity requires a notification when rerouting is invoked subsequently in the call. In addition, the processing unit PU7 may be adapted to process the instruction and to initiate a procedure for detecting invocation of rerouting. Preferably, the processing unit PU7 may initiate arming of a detection point in the BCSM for detecting invocation of rerouting.

Alternatively or in addition, the instruction from the service control entity comprises an indication of a rerouting permission related to a switching node. The rerouting permission may indicate that the call is allowed to be rerouted by a switching node that succeeds the service switching entity in the call path direction, after invocation of rerouting has taken place. Additionally, the processing unit PU7 may be adapted to process the instruction and to initiate the sending of a message, e.g. call set up message, to the succeeding switching node via the output unit OU7, whereby the message comprises an indication that the call is allowed to be rerouted by the succeeding switching node.

In a further preferred embodiment, the input unit IU7 is adapted to receive an instruction comprising a rerouting permission indication that the call is not allowed to be rerouted, in the event of a later invocation of rerouting during the call. Additionally, the processing unit PU7 may be adapted to process the instruction and to initiate sending a message, e.g. a call set up message, via the output unit OU7, to the succeeding switching node, whereby the message comprises an indication that the call is not allowed to be rerouted by the succeeding switching node.

Furthermore, the input unit IU7 may be adapted to receive information relating to the rerouting of the call comprising an indication of the invocation of the rerouting of the call at a further switching node that succeeds the service switching entity in the call path direction. In addition, the input unit IU7 may be adapted to receive information relating to the rerouting of the call comprising an indication of the rerouting destination entity. Preferably, the processing unit PU7 may be adapted to process this information. In particular, the processing unit PU7 may be adapted to extract the information from a message wherein it is received and to obtain the indication of the invocation of the rerouting and/or to obtain the indication of the rerouting destination entity. Additionally, the processing unit PU7 may be adapted to initiate the sending of the information via the output unit OU7 to the service control entity. In a preferred embodiment, the processing unit PU7 may be adapted to initiate the sending of the information in a message, preferably a CAMEL event report message, comprising a dedicated information element for indicating the invocation of the rerouting of the call and/or a dedicated information element for indicating the rerouting destination. The processing unit PU7 may have modified the information before initiate the sending to the service control entity.

According to an alternative embodiment, the input unit IU7 is adapted to receive an instruction comprising a rerouting permission indicating whether or not the call is allowed to be rerouted to the rerouting destination entity. Additionally, the processing unit PU7 may be adapted to process the instruction.

If the instruction comprises a rerouting permission indication that the call is allowed to be rerouted to the rerouting destination entity, the processing unit PU7 may be further adapted to initiate sending a message, e.g. a call set up message, via the output unit OU7, to the preceding switching node, or to initiate sending a call release message, via the output unit OU7, to the preceding switching node, whereby the call release message comprises the rerouting destination and an indication that the call is allowed to be rerouted by the preceding switching node.

Alternatively, if the instruction comprises a rerouting permission indication that the call is not allowed to be rerouted to the rerouting destination entity, the processing unit PU7 may be further adapted to initiate sending a message, e.g. a call release message, via the output unit OU7, to the preceding switching node, whereby the message comprises an indication that the call is not allowed to be rerouted by the preceding switching node.

The input unit IU7 may be further adapted to receive an instruction comprising an indication that the call is to be rerouted to a modified rerouting destination entity. In addition, the processing unit PU7 may be adapted to process the instruction and to initiate sending a message, e.g. a call set up message, via the output unit OU7, to the preceding switching node, whereby the message comprises an indication of the modified rerouting destination entity. Alternatively, the processing unit PU7 may initiate sending a call release message, via the output unit OU7, to the preceding switching node, whereby the call release message comprises an indication of the modified rerouting destination entity and an indication that the call is allowed to be rerouted by the preceding switching node.

IN protocols like INAP and CAMEL Application Part (CAP, e.g. CAPv4, see 3GPP TS 29.078 and 3GPP TS 23.078) are preferably amended by at least one of the following detailed enhancements to provide a service switching entity and a service control entity with the capabilities according to the invention:

a) A new information element (IE) may be added to the "Initial Detection Point" (InitialDP or IDP in short) message for indicating to the service control entity that a preceding switching node may perform rerouting:

| Information Element name | Description |
| --- | --- |
| Rerouting/Pivot Indicator | This IE indicates whether a preceding switching node supports rerouting. |

The IDP comprising the new information element may be used by the service switching entity to send the information relating to the rerouting of the call to the service control entity. For example, the information relating to the rerouting of the call comprises an indication that a preceding switching node supports rerouting. The Rerouting/Pivot Indicator in the IDP is used to carry this information to the service control entity.

b) The messages "ContinueWithArgument" (CWA) and "Connect" (CON) may be used to carry information regarding the instruction for the rerouting procedure to be followed by the service switching entity. A new "Rerouting/Pivot indicator" information element (IE) may be added to the "ContinueWithArgument" and to the "Connect" for this purpose. Also, a new information element for the indication of the rerouting destination entity may be added to the "ContinueWithArgument" and the "Connect" to inform the service switching entity thereof.

| Information Element name | Description |
| --- | --- |
| Rerouting/Pivot Indicator | This IE indicates to the service switching entity whether rerouting is: to be suppressed, prior to invocation of rerouting; or after invocation of rerouting: allowed; or allowed on the outgoing side of the service switching entity, i.e. by a succeeding node in the call path direction; or not allowed |
| Rerouting Destination Indicator | This IE comprises the rerouting destination entity indicated by the rerouting invoking node or the service control entity |

The "ContinueWithArgument" or the "Connect" message comprising the new Rerouting/Pivot Indicator may be used by the service control entity to send an instruction to the service switching entity to continue the call to according to the rerouting procedure selected by the service control entity. For example, to instruct the service switching entity that rerouting to an earlier indicated rerouting destination entity is not allowed (or any other kind of permission). Accordingly the Rerouting/Pivot Indicator comprises a value that indicates to the service switching entity that rerouting is not allowed (or any other kind of permission relating to rerouting).

c) The indication of the rerouting destination entity may be added to the "Event Report BSCM" message, event report message in short, when the corresponding Event Type BCSM IE contains Route Select Failure, or a busy event.

| Information Element name | Description |
| --- | --- |
| Rerouting Destination Indicator | This IE comprises the rerouting destination entity indicated by the rerouting invoking node |

An event report message comprising the new information element may be used by the service switching entity to send the information relating to the rerouting of the call to the service control entity. For example, the information relating to the rerouting of the call comprises an indication of the invocation of a rerouting to a rerouting destination entity at a switching node, succeeding the switching node in the call path direction, together with an indication of the rerouting destination entity. The new Rerouting Destination Indicator is used to carry the indication of the rerouting destination entity to the service control entity.

d) The message "Release Call" (REL) may be used to carry information regarding the instruction for the rerouting procedure to be followed by the switching entity. A new "Rerouting Destination Indicator" information element (IE) may be added to the "Release Call" for this purpose:

| Information Element name | Description |
| --- | --- |
| Rerouting Destination Indicator | This IE indicates the rerouting destination entity to which the service switching entity should reroute the call. |

The service control entity may use the adapted "Release Call" message to send an instruction to the service switching entity to continue the call according to the rerouting procedure selected by the service control entity. For example, to instruct the service switching entity that the call is to be rerouted to a modified destination entity. The new Rerouting Destination Indicator is used to carry the indication of the modified destination entity to the service switching entity.

It is apparent that the invention may be implemented in any telecommunication network like a GSM, Code Division Multiple Access (CDMA), Time Division Multiple Access (TDMA), Universal Mobile Telecommunication System (UMTS), or 4G network. A service control entity is typically embodied in a single device or may be distributed over several devices. The corresponding applies to a service switching entity. A service control entity and a service switching entity may be implemented as separate functions on the same device or platform.

The invention claimed is:

1. A method for controlling a rerouting of a call from a called entity to a rerouting destination entity in a telecommunications network comprising a service control entity, a service switching entity and a switching node preceding the service switching entity in a call path direction from a calling entity to the called entity, wherein the service control entity performs the steps of:
receiving information relating to the rerouting of the call from the service switching entity in a message comprising a dedicated information element, comprising an indication of the rerouting destination entity, indicating invocation of rerouting of the call at a further switching node succeeding the service switching entity in the cell path direction,
selecting a rerouting procedure for the call according to the received information, and
sending an instruction to the service switching entity to continue the call according to the rerouting procedure.

2. The method according to claim 1, wherein the information relating to the rerouting of the call comprises an indication whether the switching node supports the rerouting of the call.

3. The method according to claim 1, wherein the information relating to the rerouting of the call is received in an initial message comprising a dedicated information element for indicating the information relating to the rerouting of the call.

4. The method according to claim 1, wherein the rerouting procedure prescribes that the service control entity requires a notification when rerouting is invoked subsequently in the call.

5. The method according to claim 1, wherein the rerouting procedure comprises a rerouting permission relating to a switching node.

6. The method according to claim 5, wherein the rerouting permission comprises an indication that the call is allowed to be rerouted by a switching node succeeding the service switching entity in the call path direction.

7. The method according to claim 1, wherein the rerouting procedure prescribes to reroute the call to a modified rerouting destination entity.

8. A method for controlling a rerouting of a call from a called entity to a rerouting destination entity in a telecommunications network comprising a service control entity, a service switching entity and a switching node preceding the service switching entity in a call path direction from a calling entity to the called entity, wherein the service switching entity performs the steps of:
receiving information, relating to the rerouting of the call, comprising an invocation of the rerouting of the call at a further switching node succeeding the service switching entity in the call path direction and sent to the service control entity in a message comprising a dedicated information element for the invocation of the rerouting of the call,
sending the information relating to the rerouting of the call to the service control entity,
receiving an instruction from the service control entity to continue the call according to a rerouting procedure selected by the service control entity, and
continue the call according to the instruction received.

9. The method according to claim 8, wherein the information relating to the rerouting of the call is received from the switching node preceding the service switching entity in the call path direction and wherein the information comprises an indication whether the switching node supports rerouting of the call.

10. The method according to claim 8 wherein the information relating to the rerouting of the call is sent to the service control entity in an initial message comprising a dedicated information element for indicating the information relating to the rerouting of the call.

11. The method according to claim 8, wherein the information relating to the rerouting of the call is modified by the service switching entity before sending it to the service control entity.

12. The method according to claim 8, wherein the instruction comprises an indication that the service control entity requires a notification when rerouting is invoked subsequently in the call and wherein the service switching entity initiates a procedure for detecting invocation of rerouting.

13. The method according to claim 8, wherein the instruction comprises an indication of a rerouting permission related to a switching node.

14. The method according to claim 13, wherein the rerouting permission indicates that the call is allowed to be rerouted by a switching node succeeding the service switching entity in the call path direction and wherein the service switching entity sends a message to the succeeding switching node, whereby the message comprises an indication that the call is allowed to be rerouted by the succeeding switching node.

15. The method according to claim 13, wherein the rerouting permission indicates that the call is allowed to be rerouted to the rerouting destination entity and wherein the service switching entity sends a message comprising the indication of the rerouting destination entity to the preceding switching node.

16. The method according to claim 15, wherein the message further comprises the indication that the call is allowed to be rerouted by the preceding switching node.

17. The method according to claim 13, wherein the rerouting permission indicates that the call is not allowed to be rerouted and wherein the service switching entity sends a message to the preceding switching node comprising the indication that the call is not allowed to be rerouted.

18. The method according to claim 8, wherein the information relating to the rerouting of the call comprises an indication of the rerouting destination entity.

19. The method according to claim 8, wherein the information relating to the rerouting of the call is modified by the service switching entity before sending it to the service control entity.

20. The method according to claim 8, wherein the instruction comprises an indication to reroute the call to a modified rerouting destination entity and wherein the service switching entity sends a message comprising an indication of the modified rerouting destination entity to the preceding switching node.

21. A service control entity for controlling a rerouting of a call from a called entity to a rerouting destination entity in a telecommunications network comprising a service control entity, a service switching entity and a switching node preceding the service switching entity in a call path direction from a calling entity to the cased entity, wherein the service control entity comprises:
receiving means for receiving information relating to the rerouting of the call from the service switching entity entity in a message comprising a dedicated information element, comprising an indication of the rerouting destination entity, indicating invocation of rerouting of the call at a further switching node succeeding the service switching entity in the call path direction,
selection means for selecting a rerouting procedure for the call according to the received information, and
transmission means for sending an instruction to the service switching entity to continue the call according to the rerouting procedure.

22. The service control entity according to claim 21, wherein the information relating to the rerouting of the call comprises an indication whether the switching node supports the rerouting of the can.

23. The service control entity according to claim 21, wherein the information relating to the rerouting of the call is received in an initial message comprising a dedicated information element for indicating the information relating to the rerouting of the call.

24. The method according to claim 21, wherein the rerouting procedure prescribes that the service control entity requires a notification when rerouting is invoked subsequently in the call.

25. The method according to claim 21, wherein the rerouting procedure comprises a rerouting permission relating to a switching node.

26. A service switching entity for controlling a rerouting of a call from a called entity to a rerouting destination entity in a telecommunications network comprising a service control entity, a service switching entity and a switching node preceding the service switching entity in a call path direction from a calling entity to the called entity, the service switching entity comprising:
receiver means for receiving information relating to the rerouting of the call, comprising an invocation of the rerouting of the call at a further switching node succeeding the service switching entity in the call path direction and sent to the service control entity in a message comprising a dedicated information element for the invocation of the rerouting of the call, transmission means for sending the information relating to the rerouting of the call to the service control entity, the receiver means for receiving an instruction from the service control entity to continue the call according to a rerouting procedure selected by the service control, and means for continuing the call according to the instruction received.

27. The method according to claim 26, wherein the information relating to the rerouting of the call is received from the switching node preceding the service switching entity in the call path direction and wherein the information comprises an indication whether the switching node supports rerouting of the call.

28. The service switching entity according to claim 26, wherein the information relating to the rerouting of the call is sent to the service control entity in a message comprising a dedicated information element for indicating the information relating to the rerouting of the call.

29. The service switching entity according to claim 26, wherein the information relating to the rerouting of the call is modified by the service switching entity before sending it to the service control entity.

30. The service switching entity according to claim 26, wherein the instruction comprises an indication that the service control entity requires a notification when rerouting is invoked subsequently in the call and wherein the service switching entity initiates a procedure for detecting invocation of rerouting.

* * * * *

UNITED STATES PATENT AND TRADEMARK OFFICE
CERTIFICATE OF CORRECTION

PATENT NO.         : 8,346,232 B2  
APPLICATION NO.    : 12/676747  
DATED              : January 1, 2013  
INVENTOR(S)        : Mariniello et al.

Page 1 of 1

It is certified that error appears in the above-identified patent and that said Letters Patent is hereby corrected as shown below:

On the Title Page, Item (56), under "OTHER PUBLICATIONS", in Column 2, Line 2, delete "IndependentCall" and insert -- Independent Call --, therefor.

In the Specifications

In Column 17, Line 36, delete "call to according to" and insert -- call according to --, therefor.

In the Claims

In Column 18, Line 50, in Claim 1, delete "cell" and insert -- call --, therefor.

In Column 19, Line 38, in Claim 10, delete "8" and insert -- 8, --, therefor.

In Column 20, Line 27, in Claim 21, delete "cased" and insert -- called --, therefor.

In Column 20, Lines 30-31, in Claim 21, delete "switching entity entity" and insert -- switching entity --, therefor.

In Column 20, Line 44, in Claim 22, delete "can." and insert -- call. --, therefor.

In Column 20, Line 50, in Claim 24, delete "method" and insert -- service control entity --, therefor.

In Column 20, Line 54, in Claim 25, delete "method" and insert -- service control entity --, therefor.

In Column 21, Line 11, in Claim 27, delete "method" and insert -- service switching entity --, therefor.

Signed and Sealed this  
Fourteenth Day of May, 2013

Teresa Stanek Rea  
*Acting Director of the United States Patent and Trademark Office*